Oct. 8, 1935.   E. FISCHEL   2,016,857
SELF STEERING ARRANGEMENT
Filed March 5, 1935
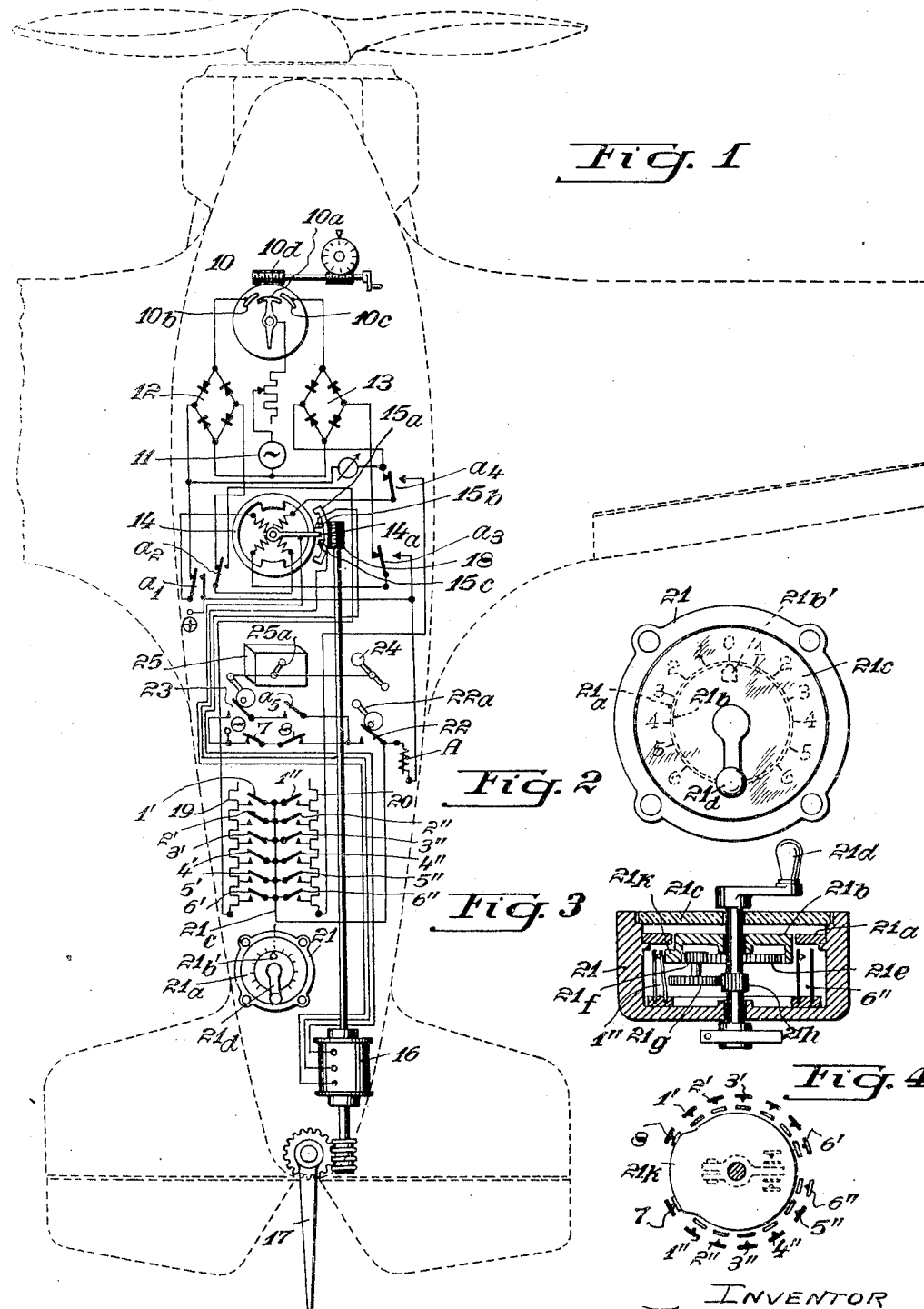
INVENTOR
EDUARD FISCHEL
BY
ATTORNEYS.

Patented Oct. 8, 1935

2,016,857

UNITED STATES PATENT OFFICE 2,016,857

SELF STEERING ARRANGEMENT

Eduard Fischel, Berlin-Charlottenburg, Germany, assignor to Siemens Apparate und Maschinen G. m. b. H., Berlin, Germany, a corporation of Germany Application March 5, 1935, Serial No. 9,429
In Germany March 2, 1934

4 Claims. (Cl. 244—29)

My invention relates to steering apparatus for craft, particularly aircraft, and especially to such apparatus as is designed for automatic operation in course and curve flying.

The object of my invention is to prevent the craft from taking immediately a course or path of greater or less curvature, according to the adjustment of a curved-course setting device, if the automatic steering apparatus for curve flying is thrown into action after a period of manual operation or of automatic course steering. In this case, the aircraft would suddenly and quite unexpectedly for the pilot, swerve into a curved course, which might be attended with very serious risk. Such possibilities are prevented by this invention.

According to my invention, the automatic steering apparatus is combined with a blocking device which prevents the change from manually steered flying to automatically steered curve flying, as long as the curved-course setting device determining the degree of curvature and the direction of the curve is not returned within a predetermined limit, for instance to the zero position.

In the accompanying drawing illustrating a preferred form of this invention, Fig. 1 is a partial plan view showing the invention as applied to the rudder control of an airplane; Fig. 2 is a plan view of the curved-course setting device, upon an enlarged scale; Fig. 3 is a vertical section of said device, and Fig. 4 is a top view of a cam disk forming part of the curved-course setting device, with the bank or set of contacts controlled by said cam disk.

Referring to Fig. 1, 10 denotes the course indicator or direction finder, consisting of a usual type of electrolytic compass, for automatic course steering. The electrode 10a connected to the compass needle moves between two electrodes 10b and 10c. The casing of the compass can be adjusted from the pilot's seat through a worm gear 10d in accordance with the desired course. The above-mentioned electrodes 10a, 10b and 10c are connected in a differential circuit which is fed from the alternating current source 11 and the two branches of which contain a rectifier bridge 12 and 13 respectively. On the direct current side, these two rectifier bridges are connected to the two windings of a rotary magnet 14 or the like, by means of which the deviations from the course are converted into corresponding deflections of a contact arm 14a or the like connected to the rotatable part of the rotary magnet 14. The contact arm 14a controls the controlling motor 16 by means of the two contacts 15b and 15c mounted on a pivoted carrier 15a and connected as illustrated. This motor, in turn, correspondingly adjusting the vertical rudder 17. The carrier 15a carrying the contacts 15b and 15c is also coupled to the motor through a worm drive 18 and is thus turned or shifted about its pivot axis (which coincides with the pivot of the contact arm 14a) in accordance with the movements of the contact arm 14a, simultaneously with the adjustment of the rudder. The described arrangement consisting of the parts 15a, 15b, 15c and 16, may be designated as a "rudder actuating device" and may also be, for instance, of a hydraulic or pneumatic nature in a manner well-known per se.

In the illustrated position of the parts, therefore, the direction finder 10 is connected to the rudder actuating device 15a, 15b, 15c, 16. If a change-over to curve flying is to be effected, the connection of the rudder actuating device is to be changed from the direction finder 10 to switching means (curve-setting device) which determine the curve travel and the extent of the curve, and this is preferably effected by connecting the rotary magnet 14 to said means instead of connecting said magnet to the direction finder 10.

The means serving to carry out a flight in a curve comprise among other constructional details two resistances 19 and 20, each of which is subdivided by tappings into a plurality of steps, for instance six steps. The tappings lead to the contacts 1' to 6' and the contacts 1" to 6" respectively. These contacts are actuated by means of a cam disc which is mounted in the curve-adjusting or setting apparatus 21. The contacts 1' to 6', 1" to 6" and 7 and 8 are also disposed in the casing of this apparatus. For the sake of clearer illustration, however, Fig. 1 shows these contacts outside of the apparatus 21. The latter comprises a pot-like casing, equipped at the upper part thereof with a glass cover 21c. A shaft is rotatably mounted in the casing of the apparatus 21. One end of the shaft extends through the glass cover 21c and carries the crank 21d. Below the glass cover 21c a disc 21b is arranged which is surrounded by an annular ring 21a secured to the casing of the apparatus 21, there being a clearance between the disc 21b and the annular ring 21a. The annular ring 21a is as disclosed in Fig. 2 provided with a scale whereas the disc 21b carries a pointer 21b'. The disc 21b has at the periphery thereof a flange provided with an internal gearing 21e by means of which the disc 21b is coupled to the shaft of the crank 21d through the gears 21f, 21g, and 21h. The gear ratio is so chosen that upon a complete rotation of the crank 21d the pointer 21b' of the disc 21b moves over the scale of the disc 21a by one division. The flange of the disc 21b is provided with a cam 21k as shown in Figs. 3 and 4. The contacts 7, 8, 1' to 6' and 1" to 6" lie in the path of the cam 21k. These contacts are secured to the bottom of the casing of the apparatus 21. The connection of the contacts will be apparent from Fig. 1.

The distance of the contacts 8, 1' to 6' and 7, 1" to 6" from one another is so chosen that upon a complete rotation of the crank 21d the cam 21k moves into operative relation to the next contact. If the pointer 21b' indicates the zero position on the scale disposed on the disc 21a, the cam 21k assumes the relative position as to the corresponding contacts 7 and 8 as shown in Fig. 4. Upon a complete rotation of the crank 21d in the counter-clockwise direction the cam 21k rotates by such an amount and in such direction (clockwise in Fig. 4) that the contact 7 opens and the contact 1' closes. If the crank 21d is again rotated by 360° in the same direction, the contact 2' will also be closed. If the crank 21d is rotated 360° in the opposite direction from the position shown in Figs. 2 and 4, the contact 8 opens and the contact 1" closes. Upon a further rotation of the crank 21d by 360° in the same direction the contact 2" will also be closed, etc. The handle 21d is rotated in clockwise or in counter-clockwise direction depending upon whether it is desired to turn or steer the airplane to the right or to the left. The sharper the curve to be flown is, the farther should the pointer 21b' be adjusted from the zero position relatively to the scale arranged on the annular ring 21a. The radius of curvature of the curve to be flown is, therefore, determined by the position of the pointer 21b' relative to the scale of the annular disc 21a. 22 is a preparing contact which is manually closed by means of the handle 22a if it is intended to change from course flying to curve flying.

Let it be assumed that the mark 21b' is in the zero position and, therefore, the contacts 7 and 8 are closed. If the curve flying is now prepared by closing the contact of the switch 22, a circuit is closed from the negative pole of a direct current source through the two contacts 7 and 8, the switch 22, the exciting winding of a relay A to the positive pole of the direct current source. The relay A responds and throws the movable members of the contacts a1 to a4, into the position opposite to the one illustrated, thereby connecting the windings of the rotary magnet 14 into the circuit of the resistances 19 and 20 respectively. At the same time, the relay A throws the movable member of a contact a5 to close a holding circuit. Connected in series with the contact a5 is a switch 23. This switch 23 is closed when the handle 24 is rotated in the clockwise direction for the purpose of changing from hand-steering to automatic steering. In the connection between the handle 24 and the operating member of the switch 23, there is included the operating member 25a of an apparatus 25 for automatic steering (which apparatus is of no further interest here, as it may be of any approved construction) the member 25a being adapted to be operated when changing from hand to automatic steering. Therefore, whenever the automatic steering apparatus 25 is disconnected by actuating the handle 24, the switch 23 is opened at the same time, owing to the operative connection just described.

After the preparations mentioned have been made, that is, after the switch 22 has been closed for preparing the curved flight with the automatic-steering arrangement thrown into active connection, the direction and extent of the desired curve can be set or adjusted by rotating the crank 21d. If the adjustment is to be effected, for instance, to curve 4, the crank 21d is rotated until the pointer mark 21b' connected thereto points to the mark 4 of the corresponding scale. In this case, the contacts 1', 2', 3' and 4' or 1", 2", 3" and 4" of the series of resistances 19 or 20 respectively are successively closed, and thus the amount of resistance value present in the circuit of the rotary magnet 14 is decreased with the effect that the contact arm 14a will be deflected through a corresponding angle so as to switch in the motor 16 for a rotation of corresponding extent.

While the mark 21b' is still pointing to 4 or other value of the corresponding scale, the curve flying may be interrupted by opening the switch 22, or the automatic-steering apparatus 25 may be entirely disconnected by operating the crank 24.

In both cases, that is, in the case of opening the switch 22 or in the case of opening the switch 23, the relay A is de-energized, which results in the direction finder 10 being automatically reconnected to the rotary magnet 14. If the automatic-steering apparatus 25 is again thrown into action by actuating the operating member 24 or even if the switch 22 is closed with the automatic-steering apparatus in action, the relay A remains de-energized in both cases, since its exciting circuit is interrupted at a5 and at 7 or 8 respectively in spite of the switches 22 and 23 being closed. Therefore, the direction finder remains connected to the rudder actuating device. In order to change over to curve flying, it therefore is necessary first to return the pointer mark 21b' to the zero position. Only when the zero position is reached by mark 21b' are the contacts 7 and 8 closed and then the relay A is energized. The operations are then repeated, as has been described above.

It will be understood that the blocking means described may be designed in a large variety of ways and, for instance, instead of being of an electrical nature, may be of a pneumatic or hydraulic type, without, however, departing from the ambit of the invention.

I claim as my invention:

1. In a steering apparatus for aircraft and other craft having a rudder, an actuating device for said rudder, a direction finder, a curved-course setting device, means for connecting said rudder actuating device selectively either with said direction finder or with said curved-course setting device, an automatic steering apparatus, means for throwing such automatic apparatus into or out of action, and blocking means operatively connected with said curved-course setting device, for preventing the throwing of the automatic steering apparatus into action whenever the setting of said curved-course setting device departs from a predetermined limit.

2. In a steering apparatus for aircraft and other craft having a rudder, an actuating device for said rudder, a direction finder, a curved-course setting device, a relay, means for throwing said relay into or out of active condition, a circuit including contacts controlled by said relay to connect said rudder actuating device selectively either with said direction finder or with said curved-course setting device according to the condition of said relay, an automatic steering apparatus, means for throwing such automatic apparatus into or out of action, and blocking means operatively connected with said curved-course setting device, for preventing the throwing of the automatic steering apparatus into action whenever the setting of said curved-course setting device departs from a predetermined limit.

3. In a steering apparatus for aircraft and other craft having a rudder, an actuating device for said rudder, a direction finder, a curved-course setting device including a circuit with a plurality of contacts to alter the condition of said circuit, and means for actuating said contacts, means for connecting said rudder actuating device selectively either with said direction finder or with said curved-course setting device, an automatic steering apparatus, means for throwing such automatic apparatus into or out of action, and blocking means operatively connected with said contact-actuating means, for preventing the throwing of the automatic steering apparatus into action whenever the setting of said curved-course setting device departs from a predetermined limit.

4. In a steering apparatus for aircraft and other craft having a rudder, an actuating device for said rudder, a direction finder, a curved-course setting device including a circuit with a tapped resistance and a cam for varying the amount of such resistance cut in, means for connecting said rudder actuating device selectively either with said direction finder or with said curved-course setting device, an automatic steering apparatus, means for throwing such automatic apparatus into or out of action, and blocking means, operated by said cam, for preventing the throwing of the automatic steering apparatus into action whenever the setting of said curved-course setting device departs from a predermined limit.

EDUARD FISCHEL.